(12) United States Patent
Rutten et al.

(10) Patent No.: US 11,456,927 B2
(45) Date of Patent: **\*Sep. 27, 2022**

(54) INSTALLATION AND UPGRADE OF VISUALIZATIONS FOR MANAGED NETWORKS

(71) Applicant: ServiceNow, Inc., Santa Clara, CA (US)

(72) Inventors: Ong-Aat Rutten, Amsterdam (NL); Nabil Asbi, The Hague (NL); Erik Hoffman, Drenthe (NL)

(73) Assignee: ServiceNow, Inc., Santa Clara, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 16/871,615

(22) Filed: May 11, 2020

(65) Prior Publication Data

US 2020/0274774 A1 Aug. 27, 2020

Related U.S. Application Data

(63) Continuation of application No. 15/495,304, filed on Apr. 24, 2017, now Pat. No. 10,652,106.

(51) Int. Cl.
*H04L 41/22* (2022.01)
*H04L 43/045* (2022.01)
(Continued)

(52) U.S. Cl.
CPC .......... *H04L 41/22* (2013.01); *G06F 11/0766* (2013.01); *G06F 16/248* (2019.01);
(Continued)

(58) Field of Classification Search
CPC . H04L 41/22; H04L 41/0213; H04L 41/0266; H04L 41/069; H04L 41/082;
(Continued)

(56) References Cited

U.S. PATENT DOCUMENTS 6,321,229 B1 11/2001 Goldman
6,609,122 B1 8/2003 Ensor
(Continued)

OTHER PUBLICATIONS

Servicenow, ServiceNow Documentation, Mar. 23, 2017 (downloaded from public web site http I/docs .servicenow. com).

Primary Examiner — Joseph L Greene
(74) Attorney, Agent, or Firm — Fletcher Yoder P.C.

(57) ABSTRACT

An embodiment may involve receiving a request to install or upgrade a performance analytics dashboard of a graphical user interface displayed on a client device. The performance analytics dashboard may define a data visualization related to a particular key performance indicator. A data model may represent configuration and operational characteristics of computing devices disposed within a managed network. The configuration and operational characteristics may include key performance indicators. The embodiment may also involve determining that installing or upgrading the performance analytics dashboard requires updating data within the data model. The embodiment may also involve receiving, by way of the graphical user interface, permission to update the data within the data model. The embodiment may also involve updating the data within the data model then installing or upgrading the performance analytics dashboard.

19 Claims, 12 Drawing Sheets

(51) Int. Cl.
| | |
|---|---|
| *H04L 67/06* | (2022.01) |
| *H04L 41/082* | (2022.01) |
| *H04L 41/14* | (2022.01) |
| *H04L 41/069* | (2022.01) |
| *G06F 11/07* | (2006.01) |
| *G06F 16/838* | (2019.01) |
| *G06F 16/951* | (2019.01) |
| *H04L 41/0213* | (2022.01) |
| *H04L 41/0266* | (2022.01) |
| *G06F 16/248* | (2019.01) |
| *H04L 41/28* | (2022.01) |
| *G06F 40/143* | (2020.01) |

(52) U.S. Cl.
CPC .......... *G06F 16/838* (2019.01); *G06F 16/951* (2019.01); *G06F 40/143* (2020.01); *H04L 41/0213* (2013.01); *H04L 41/0266* (2013.01); *H04L 41/069* (2013.01); *H04L 41/082* (2013.01); *H04L 41/145* (2013.01); *H04L 41/28* (2013.01); *H04L 43/045* (2013.01); *H04L 67/06* (2013.01)

(58) Field of Classification Search
CPC ..... H04L 41/145; H04L 41/28; H04L 43/045; H04L 67/06; G06F 16/838; G06F 16/951; G06F 16/248; G06F 11/0766; G06F 17/2247

See application file for complete search history.

(56) References Cited

U.S. PATENT DOCUMENTS

| | | | |
|---|---|---|---|
| 6,678,887 B1 | 1/2004 | Hallman | |
| 6,799,189 B2 | 9/2004 | Huxoll | |
| 6,816,898 B1 | 11/2004 | Scarpelli | |
| 6,895,586 B1 | 5/2005 | Brasher | |
| 7,020,706 B2 | 3/2006 | Cates | |
| 7,027,411 B1 | 4/2006 | Pulsipher | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,493,400 B2 | 2/2009 | Loaiza et al. | |
| 7,610,512 B2 | 10/2009 | Gerber | |
| 7,617,073 B2 | 11/2009 | Non | |
| 7,685,167 B2 | 3/2010 | Mueller | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,890,802 B2 | 2/2011 | Gerber | |
| 7,925,981 B2 | 4/2011 | Pourheidar | |
| 7,930,396 B2 | 4/2011 | Trinon | |
| 7,933,927 B2 | 4/2011 | Dee | |
| 7,945,860 B2 | 5/2011 | Vambenepe | |
| 7,966,398 B2 | 6/2011 | Wiles | |
| 8,051,164 B2 | 11/2011 | Peuter | |
| 8,082,222 B2 | 12/2011 | Rangarajan | |
| 8,151,261 B2 | 4/2012 | Sirota | |
| 8,224,683 B2 | 7/2012 | Manos | |
| 8,266,096 B2 | 9/2012 | Navarrete | |
| 8,380,645 B2 | 2/2013 | Kowalski | |
| 8,402,127 B2 | 3/2013 | Solin | |
| 8,457,928 B2 | 6/2013 | Dang | |
| 8,478,569 B2 | 7/2013 | Scarpelli | |
| 8,554,750 B2 | 10/2013 | Rangaranjan | |
| 8,612,408 B2 | 12/2013 | Trinon | |
| 8,646,093 B2 | 2/2014 | Myers | |
| 8,674,992 B2 | 3/2014 | Poston | |
| 8,689,241 B2 | 4/2014 | Naik | |
| 8,743,121 B2 | 6/2014 | De Peuter | |
| 8,745,040 B2 | 6/2014 | Kowalski | |
| 8,812,539 B2 | 8/2014 | Milousheff | |
| 8,818,994 B2 | 8/2014 | Kowalski | |
| 8,832,652 B2 | 9/2014 | Mueller | |
| 9,015,188 B2 | 4/2015 | Behne | |
| 9,037,536 B2 | 4/2015 | Vos | |
| 9,065,783 B2 | 6/2015 | Ding | |
| 9,098,322 B2 | 8/2015 | Apte | |
| 9,122,552 B2 | 9/2015 | Whitney | |
| 9,128,995 B1* | 9/2015 | Fletcher | H04L 41/0806 |
| 9,137,115 B2 | 9/2015 | Mayfield | |
| 9,239,857 B2 | 1/2016 | Trinon | |
| 9,317,327 B2 | 4/2016 | Apte | |
| 9,323,801 B2 | 4/2016 | Morozov | |
| 9,412,084 B2 | 9/2016 | Kowalski | |
| 9,467,344 B2 | 10/2016 | Gere | |
| 9,535,737 B2 | 1/2017 | Joy | |
| 9,557,969 B2 | 1/2017 | Sharma | |
| 9,613,070 B2 | 4/2017 | Kumar | |
| 9,645,833 B2 | 5/2017 | Mueller | |
| 9,654,473 B2 | 5/2017 | Miller | |
| 9,659,051 B2 | 5/2017 | hutchins | |
| 9,766,935 B2 | 9/2017 | Kelkar | |
| 9,792,387 B2 | 10/2017 | George | |
| 9,805,322 B2 | 10/2017 | Kelkar | |
| 9,819,729 B2 | 11/2017 | Moon | |
| 9,852,165 B2 | 12/2017 | Morozov | |
| 10,002,203 B2 | 6/2018 | George | |
| 2008/0201705 A1 | 8/2008 | Wookey | |
| 2010/0157989 A1* | 6/2010 | Krzyzanowski | G06Q 30/0601 370/352 |
| 2011/0145286 A1 | 6/2011 | Larowe et al. | |
| 2012/0266094 A1 | 10/2012 | Starr et al. | |
| 2014/0074972 A1* | 3/2014 | Togashi | H04L 67/06 709/217 |
| 2015/0033106 A1 | 1/2015 | Stetson et al. | |
| 2015/0229514 A1 | 8/2015 | Okuyama et al. | |
| 2016/0364772 A1 | 12/2016 | Denton et al. | |
| 2017/0083572 A1 | 3/2017 | Takersley et al. | |
| 2017/0212157 A1 | 7/2017 | Razon et al. | |
| 2017/0351753 A1* | 12/2017 | Duncker | G06F 16/338 |

\* cited by examiner

```
<?xml version="1.0" encoding="UTF-8"?>
<record_update table="pa_content_metadata">
  <pa_content_metadata action="INSERT_OR_UPDATE">
    <content_updated>2017-02-10 13:40:42</content_updated>
    <description>Average age of open changes</description>
    <metadata>
      <![CDATA[<?xml version="1.0" encoding="UTF-8"?> <record_update> <pa_widgets action="INSERT_OR_UPDATE"> <aggregate display value=""/> <breakdown
display_value=""/> <breakdown_level2 display_value=""/> <breakdown_page_size>10</breakdown_page_size> <chart_color display_value=""/> <color_scheme
display_value=""/> <coloring_method/> <column_bulletchart> <column_change>false</column_change> <column_change_perc>false</
column_change_perc> <column_current>true</column_current> <column_gap>false</column_gap> <column_gap_perc>false</column_gap_perc>
<column_multiple>false</column_multiple> <column_steps>3</column_steps> <column_stepsize>1</column_stepsize> <column_target>false</column_target>
<column_trend>true</column_trend> <compare_main_label/> <compare_number_of_periods>2</compare_number_of_periods> <compare_period>year</compare_period>
<date_from>00000000</date_from> <date_to>00000000</date_to> <default_indicator display_value=""/> <description>Average age of open changes</description>
<element/> <element_level2/> <elements_filter display_value=""/> <filter/> <flip_axes>false</flip_axes> <follow_element>true</follow_element>
<follow_managed_element>false</follow_managed_element> <followed_breakdown display_value=""/> <followed_breakdown_relation display_value=""/>
<gauge_autoscale>true</gauge_autoscale> <gauge_from/> <gauge_to/> <include_comments>false</include_comments> <include_confidence>false</
include_confidence> <include_forecast>false</include_forecast> <include_target>false</include_target> <include_thresholds>false</include_thresholds>
<include_trend>false</include_trend> <indicator display_value="Average age of open changes">9f3daac02d7231100b96d45a3ce610326</indicator>
<is_compare_chart>false</is_compare_chart> <lastscore_compare>previous_score</lastscore_compare> <lastscore_periods_back>1</lastscore_periods_back>
<lookup_name>Average age of open changes</lookup_name> <manual_elements> <max_color
display_value="BluePalette_5">3f804840d7333100b4964ebfae610329</max_color> <name>Average age of open changes</name> <number_of_records>10</
number_of_records> <percentages>no_percentages</percentages> <period>3m</period> <pivot_breakdown display_value=""/> <pivot_elements_filter
display_value=""/> <related_dashboards>1</related_dashboards> <scorecard_options>all</scorecard_options> <show_bar>true</show_bar>
<show_breakdown_selector>false</show_breakdown_selector> <show_data_labels> <show_legend>false</show_legend>
<show_range_selector>false</show_range_selector> <show_top_x>10</show_top_x> <show_total>false</show_total> <show_visualization_selector>false</
show_visualization_selector> <sort_direction>desc</sort_direction> <sort_on>value</sort_on> <sys_class_name>pa_widgets</sys_class_name>
<sys_created_by>admin</sys_created_by> <sys_created_on>2015-11-25 15:42:51</sys_created_on> <sys_customer_update>false</sys_customer_update>
<sys_domain>global</sys_domain> <sys_domain_path>/</sys_domain_path> <sys_id>18fb9c88eb0012001e68286b1206fee0</sys_id> <sys_mod_count>20</sys_mod_count>
<sys_name>Average age of open changes</sys_name> <sys_overrides display_value=""/> <sys_package display_value="Performance Analytics - Content Pack -
Change Management">d2885a260b3032001e684ac3b6673a61</sys_package> <sys_policy/> <sys_replace_on_upgrade>false</sys_replace_on_upgrade> <sys_scope
display_value="Global">global</sys_scope> <sys_update_name>pa_widgets_18fb9c88eb0012001e68286b1206fee0</sys_update_name> <sys_updated_by>admin</
sys_updated_by> <sys_updated_on>2015-11-26 10:06:29</sys_updated_on> <tag display_value=""/> <template>template2</template> <treemap_max_color
display_value=""/> <treemap_min_color display_value=""/> <type>score</type> <visualization>latest</visualization> <yaxis2_from/> <yaxis2_title/>
<yaxis2_to/> <yaxis_title/> <yaxis_to/> </pa_widgets> </record_update> ]]>
    </metadata>
    <name>Average age of open changes</name>
    <pa_content_pack display_value="Change Premium">b358d9e60b3032001e684ac3b6673a04</pa_content_pack>
    <sys_created_by>admin</sys_created_by>
    <sys_created_on>2017-02-10 13:40:42</sys_created_on>
    <sys_id>0c68d9e60b3032001e684ac3b6673a20</sys_id>
    <sys_mod_count>0</sys_mod_count>
    <sys_updated_by>admin</sys_updated_by>
    <sys_updated_on>2017-02-10 13:40:42</sys_updated_on>
    <type>widget</type>
    <update_available>false</update_available>
  </pa_content_metadata>
</record_update>
```

```
                    ┌──────────────────────────────────────────────────────┐
                    │ RECEIVE, FROM A CLIENT DEVICE, A REQUEST TO INSTALL OR UPGRADE A │
                    │ PERFORMANCE ANALYTICS DASHBOARD OF A GRAPHICAL USER INTERFACE │
                    │ DISPLAYED ON THE CLIENT DEVICE, WHEREIN THE PERFORMANCE ANALYTICS │
                    │ DASHBOARD DEFINES A DATA VISUALIZATION RELATED TO A PARTICULAR │
                    │ KEY PERFORMANCE INDICATOR, WHEREIN THE ONE OR MORE SERVERS ARE │
                    │ DISPOSED WITHIN A REMOTE NETWORK MANAGEMENT PLATFORM AND HAVE │ ← 900
                    │ ACCESS TO A DATA MODEL, WHEREIN THE DATA MODEL REPRESENTS │
                    │ CONFIGURATION AND OPERATIONAL CHARACTERISTICS OF COMPUTING │
                    │ DEVICES DISPOSED WITHIN A MANAGED NETWORK, WHEREIN THE MANAGED │
                    │ NETWORK IS MANAGED BY THE REMOTE NETWORK MANAGEMENT PLATFORM, │
                    │ AND WHEREIN THE CONFIGURATION AND OPERATIONAL CHARACTERISTICS │
                    │         INCLUDE KEY PERFORMANCE INDICATORS          │
                    └──────────────────────────────────────────────────────┘
                                            │
                                            ▼
                    ┌──────────────────────────────────────────────────────┐
                    │ DETERMINE THAT INSTALLING OR UPGRADING THE PERFORMANCE ANALYTICS │ ← 902
                    │   DASHBOARD REQUIRES UPDATING DATA WITHIN THE DATA MODEL    │
                    └──────────────────────────────────────────────────────┘
                                            │
                                            ▼
                    ┌──────────────────────────────────────────────────────┐
                    │  RECEIVE, BY WAY OF THE GRAPHICAL USER INTERFACE, PERMISSION TO │ ← 904
                    │           UPDATE THE DATA WITHIN THE DATA MODEL            │
                    └──────────────────────────────────────────────────────┘
                                            │
                                            ▼
                    ┌──────────────────────────────────────────────────────┐
                    │ IN RESPONSE TO RECEIVING PERMISSION TO UPDATE THE DATA WITHIN THE │
                    │ DATA MODEL, UPDATE THE DATA WITHIN THE DATA MODEL THEN INSTALL OR │
                    │ UPGRADE THE PERFORMANCE ANALYTICS DASHBOARD, WHEREIN WHEN THE │ ← 906
                    │     DATA MODEL INCLUDES A REPRESENTATION OF THE PARTICULAR KEY     │
                    │ PERFORMANCE INDICATOR, THE DATA VISUALIZATION IS DISPLAYABLE ON THE │
                    │   GRAPHICAL USER INTERFACE TO REPRESENT THE PARTICULAR KEY   │
                    │                PERFORMANCE INDICATOR                 │
                    └──────────────────────────────────────────────────────┘
```

FIG. 9

INSTALLATION AND UPGRADE OF VISUALIZATIONS FOR MANAGED NETWORKS

CROSS-REFERENCE TO RELATED APPLICATIONS

This application is a continuation of U.S. patent application Ser. No. 15/495,304, filed Apr. 24, 2017, which is hereby incorporated by reference in its entirety.

BACKGROUND

Managed networks may refer to various types of computer networks that can be remotely administered. This management may involve one or more server devices disposed with a remote network management platform executing management software to collect information about the configuration and operational states of computing devices in the managed network, and then presenting representations of this information by way of one or more user interfaces. The user interfaces may be, for instance, web-based user interfaces.

Some of the collected information may relate to key performance indicators (KPIs). KPIs include any sort of measurement, reading, or data that is relevant to the managed network. Thus, KPIs may reflect performance of computing devices on the network itself (e.g., memory utilization, processor utilization, transactions per second) or performance of higher-level applications executing on the network (e.g., number of times per day a user on the managed network has requested a particular type of technical assistance). Among other capabilities, the user interfaces may be able to display KPIs in numerous visualizations, such as charts, graphs, or tables.

SUMMARY

In conventional systems, visualizations of KPIs require these KPIs to be supported. The associations between KPIs and visualizations may be defined in an underlying data model (e.g., a database schema) of the remote network management platform. Thus, installing or activating a particular visualization may update the data model in order to include support for the necessary KPIs. This arrangement has a number of drawbacks for users of the remote network management platform. Notably, the users could potentially lose access to certain KPIs, or the definition of these KPIs may change, as a result of an upgrade. Furthermore, the act of installing or upgrading just one visualization could impact the entire data model, resulting in changes to the remote network management platform in areas that are unrelated to KPIs or visualizations.

The embodiments herein address these problems by allowing visualizations to be defined independently from KPIs. By decoupling visualizations and KPIs, new visualizations can be added or upgraded without impacting existing KPIs or other aspects of the data model. While some visualizations may still rely on the presence of particular KPIs in the data model, it is up to the user to ensure that these KPIs are present.

In possible embodiments, users of the remote network management platform may be presented with a list of installable dashboards that are configured as plugins to the remote network management platform. Each dashboard may include one or more visualizations. Users may install a dashboard as a whole, thus installing all of the visualizations therein, or the users may install individual visualizations. In order to allow users control over the impact of these potential installations, the remote network management platform may indicate whether each dashboard and/or visualization is already installed, and/or whether installing dashboards or visualizations will overwrite previous installs or otherwise impact dashboards or visualizations. Thus, the user has control over the extent to which the system is impacted by installations or upgrades of visualizations.

Accordingly, a first example embodiment may involve one or more databases disposed within a remote network management platform. The one or more databases may include a data model that represents configuration and operational characteristics of computing devices disposed within a managed network. The managed network may be managed by the remote network management platform. The configuration and operational characteristics may include key performance indicators related to the managed network. The first example embodiment may also include one or more server devices disposed within the remote network management platform and configured to: receive, by way of a graphical user interface displayed on a client device, a request to install or upgrade a performance analytics dashboard displayable by the graphical user interface, where the performance analytics dashboard defines a data visualization related to a particular key performance indicator; determine that installing or upgrading the performance analytics dashboard requires updating data within the data model; receive, by way of the graphical user interface, permission to update the data within the data model; and in response to receiving permission to update the data within the data model, updating the data within the data model then installing or upgrading the performance analytics dashboard. When the data model includes a representation of the particular key performance indicator, the data visualization is displayable on the graphical user interface to represent the particular key performance indicator.

A second example embodiment may involve receiving, by one or more server devices and from a client device, a request to install or upgrade a performance analytics dashboard of a graphical user interface displayed on the client device. The performance analytics dashboard may define a data visualization related to a particular key performance indicator. The one or more servers may be disposed within a remote network management platform and have access to a data model. The data model may represent configuration and operational characteristics of computing devices disposed within a managed network. The managed network may be managed by the remote network management platform. The configuration and operational characteristics may include key performance indicators. The second example embodiment may also involve determining, by the one or more server devices, that installing or upgrading the performance analytics dashboard requires updating data within the data model. The second example embodiment may also involve receiving, by the one or more server devices and by way of the graphical user interface, permission to update the data within the data model. The second example embodiment may also involve, possibly in response to receiving permission to update the data within the data model, the one or more server devices updating the data within the data model then installing or upgrading the performance analytics dashboard. When the data model includes a representation of the particular key performance indicator, the data visualization is displayable on the graphical user interface to represent the particular key performance indicator.

In a third example embodiment, an article of manufacture may include a non-transitory computer-readable medium having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8B depicts a definition of a visualization, in accordance with example embodiments.

FIG. 9 is a flow chart, in accordance with example embodiments.

DETAILED DESCRIPTION

Figure 1:
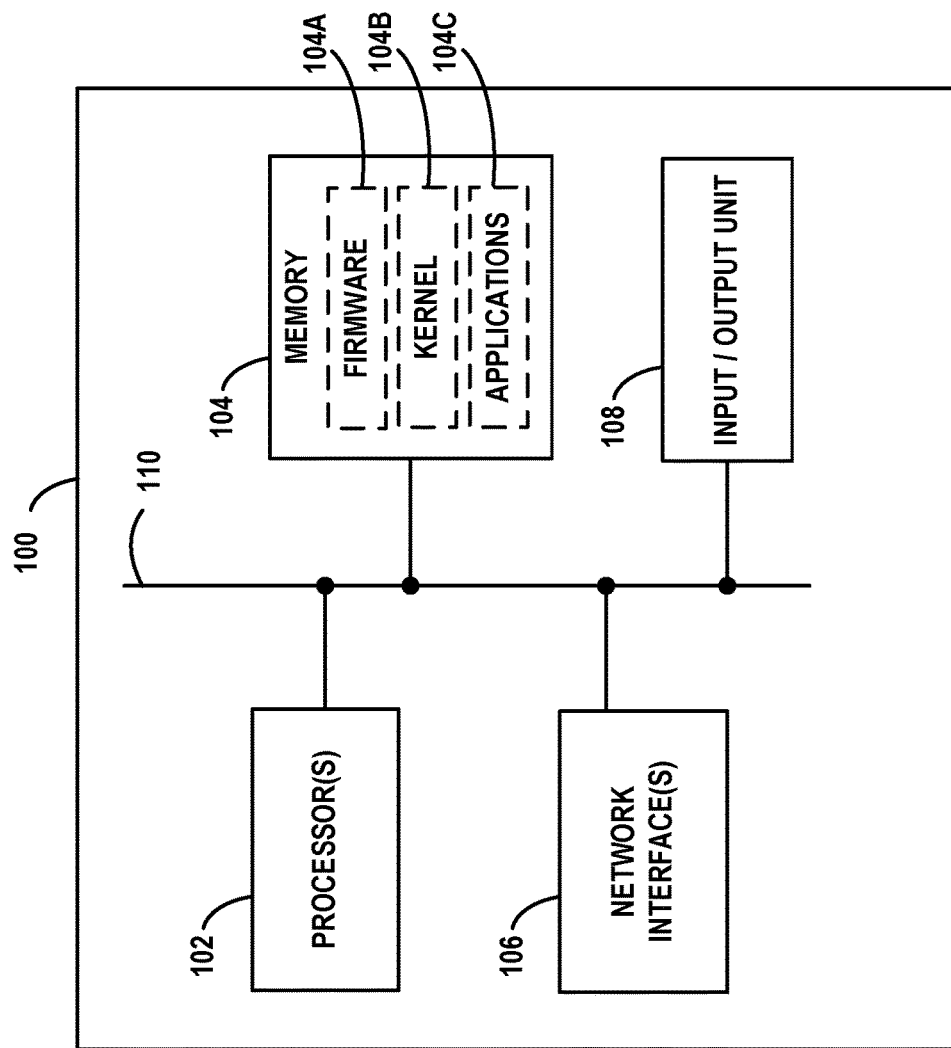
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations.

In this example, computing device 100 includes processor(s) 102 (referred to as "processor 102" for sake of simplicity), memory 104, network interface(s) 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be any type of computer processing unit, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be a single-core processor, and in other cases, processor 102 may be a multi-core processor with multiple independent processing units. Processor 102 may also include register memory for temporarily storing instructions being executed and related data, as well as cache memory for temporarily storing recently-used instructions and data.

Memory 104 may be any form of computer-usable memory, including but not limited to register memory and cache memory (which may be incorporated into processor 102), as well as random access memory (RAM), read-only memory (ROM), and non-volatile memory (e.g., flash memory, hard disk drives, solid state drives, compact discs (CDs), digital video discs (DVDs), and/or tape storage). Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/ output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs.

Network interface(s) 106 may take the form of a wireline interface, such as Ethernet (e.g., Fast Ethernet, Gigabit Ethernet, and so on). Network interface(s) 106 may also support communication over non-Ethernet media, such as coaxial cables or power lines, or over wide-area media, such as Synchronous Optical Networking (SONET) or digital subscriber line (DSL) technologies. Network interface(s) 106 may also take the form of a wireless interface, such as IEEE 802.11 (Wifi), BLUETOOTH®, global positioning system (GPS), or a wide-area wireless interface. However, other forms of physical layer interfaces and other types of standard or proprietary communication protocols may be used over network interface(s) 106. Furthermore, network interface(s) 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
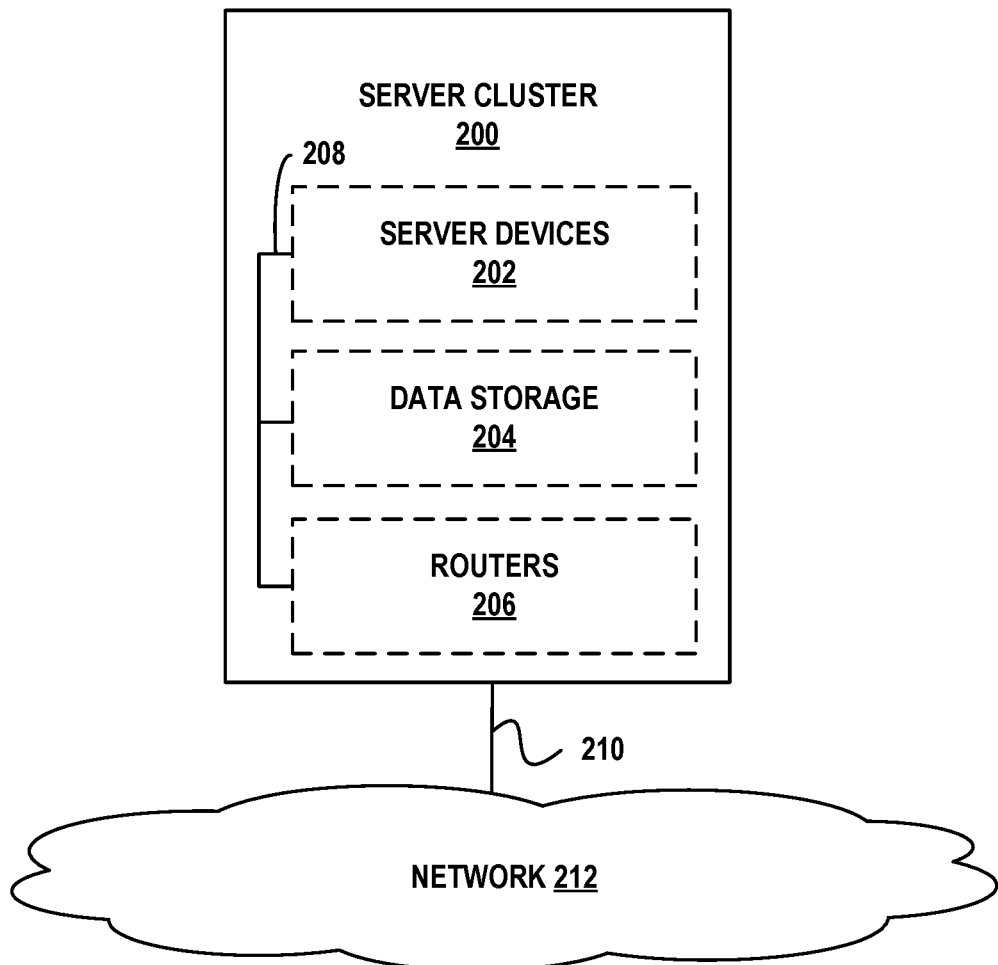
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
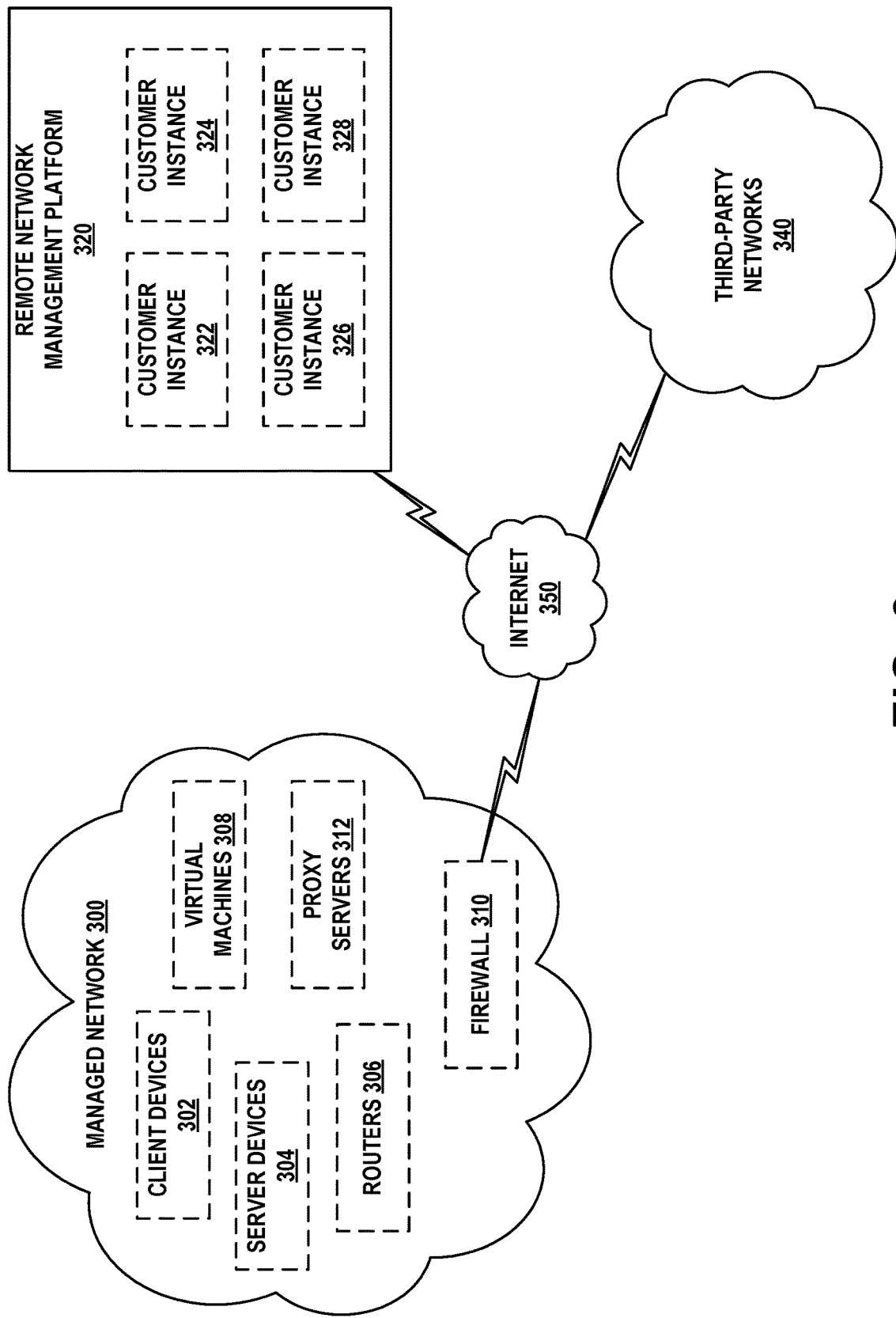
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices and services therein, while allowing authorized communication that is initiated from managed network 300. Firewall 310 may also provide intrusion detection, web filtering, virus scanning, application-layer gateways, and other services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more customer instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four customer instances 322, 324, 326, and 328. Each of these instances may represent a set of web portals, services, and applications (e.g., a wholly-functioning aPaaS system) available to a particular customer. In some cases, a single customer may use multiple customer instances. For example, managed network 300 may be an enterprise customer of remote network management platform 320, and may use customer instances 322, 324, and 326. The reason for providing multiple instances to one customer is that the customer may wish to independently develop, test, and deploy its applications and services. Thus, customer instance 322 may be dedicated to application development related to managed network 300, customer instance 324 may be dedicated to testing these applications, and customer instance 326 may be dedicated to the live operation of tested applications and services.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database In contrast, the multi-instance architecture provides each customer with its own database in a dedicated computing instance. This prevents comingling of customer data, and allows each instance to be independently managed. For example, when one customer's instance experiences an outage due to errors or an upgrade, other customer instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple customer instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, customer instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
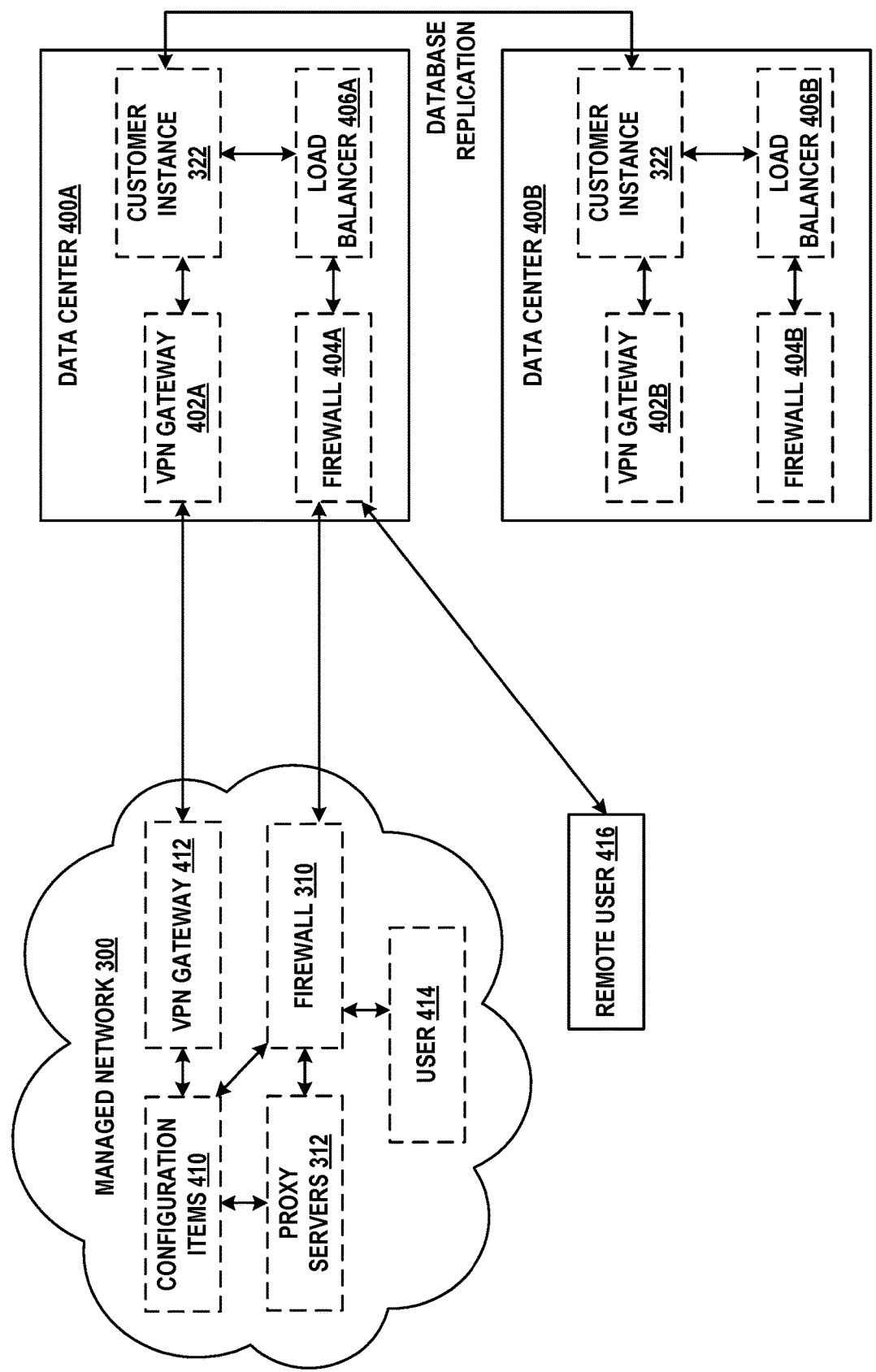
FIG. 4 depicts a communication environment involving a remote network management architecture, in accordance with example embodiments.

FIG. 4 further illustrates the communication environment between managed network 300 and customer instance 322, and introduces additional features and alternative embodiments. In FIG. 4, customer instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC). Firewall 404A may be configured to allow access from authorized users, such as user 414 and remote user 416, and to deny access to unauthorized users. By way of firewall 404A, these users may access customer instance 322, and possibly other customer instances. Load balancer 406A may be used to distribute traffic amongst one or more physical or virtual server devices that host customer instance 322. Load balancer 406A may simplify user access by hiding the internal configuration of data center 400A, (e.g., customer instance 322) from client devices. For instance, if customer instance 322 includes multiple physical or virtual computing devices that share access to multiple databases, load balancer 406A may distribute network traffic and processing tasks across these computing devices and databases so that no one computing device or database is significantly busier than the others. In some embodiments, customer instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, customer instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of customer instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of customer instance 322 with one or more Internet Protocol (IP) addresses of data center 400A may re-associate the domain name with one or more IP addresses of data center 400B. After this re-association completes (which may take less than one second or several seconds), users may access customer instance 322 by way of data center 400B.

FIG. 4 also illustrates a possible configuration of managed network 300. As noted above, proxy servers 312 and user 414 may access customer instance 322 through firewall 310. Proxy servers 312 may also access configuration items 410. In FIG. 4, configuration items 410 may refer to any or all of client devices 302, server devices 304, routers 306, and virtual machines 308, any applications, programs, or services executing thereon, as well as relationships between devices and services. Thus, the term "configuration items" may be shorthand for any physical or virtual device or service remotely discoverable or managed by customer instance 322, or relationships between discovered devices and services. Configuration items may be represented in a configuration management database (CMDB) of customer instance 322.

As noted above, VPN gateway 412 may provide a dedicated VPN to VPN gateway 402A. Such a VPN may be helpful when there is a significant amount of traffic between managed network 300 and customer instance 322, or security policies otherwise suggest or require use of a VPN between these sites. In some embodiments, any device in managed network 300 and/or customer instance 322 that directly communicates via the VPN is assigned a public IP address. Other devices in managed network 300 and/or customer instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device and Service Discovery

In order for remote network management platform 320 to administer the devices and services of managed network 300, remote network management platform 320 may first determine what devices are present in managed network 300, the configurations and operational statuses of these devices, and the services provided by the devices, and well as the relationships between discovered devices and services. As noted above, each device, service, and relationship may be referred to as a configuration item. The process of defining configuration items within managed network 300 is referred to as discovery, and may be facilitated at least in part by proxy servers 312.

For purpose of the embodiments herein, a "service" may refer to a process, thread, application, program, server, or any other software that executes on a device. A "service" may also refer to a high-level capability provided by multiple processes, threads, applications, programs, and/or servers on one or more devices working in conjunction with one another. For example, a high-level web service may involve multiple web application server threads executing on one device and accessing information from a database service that executes on another device. The distinction between different types or levels of services may depend upon the context in which they are presented.

Figure 5A:
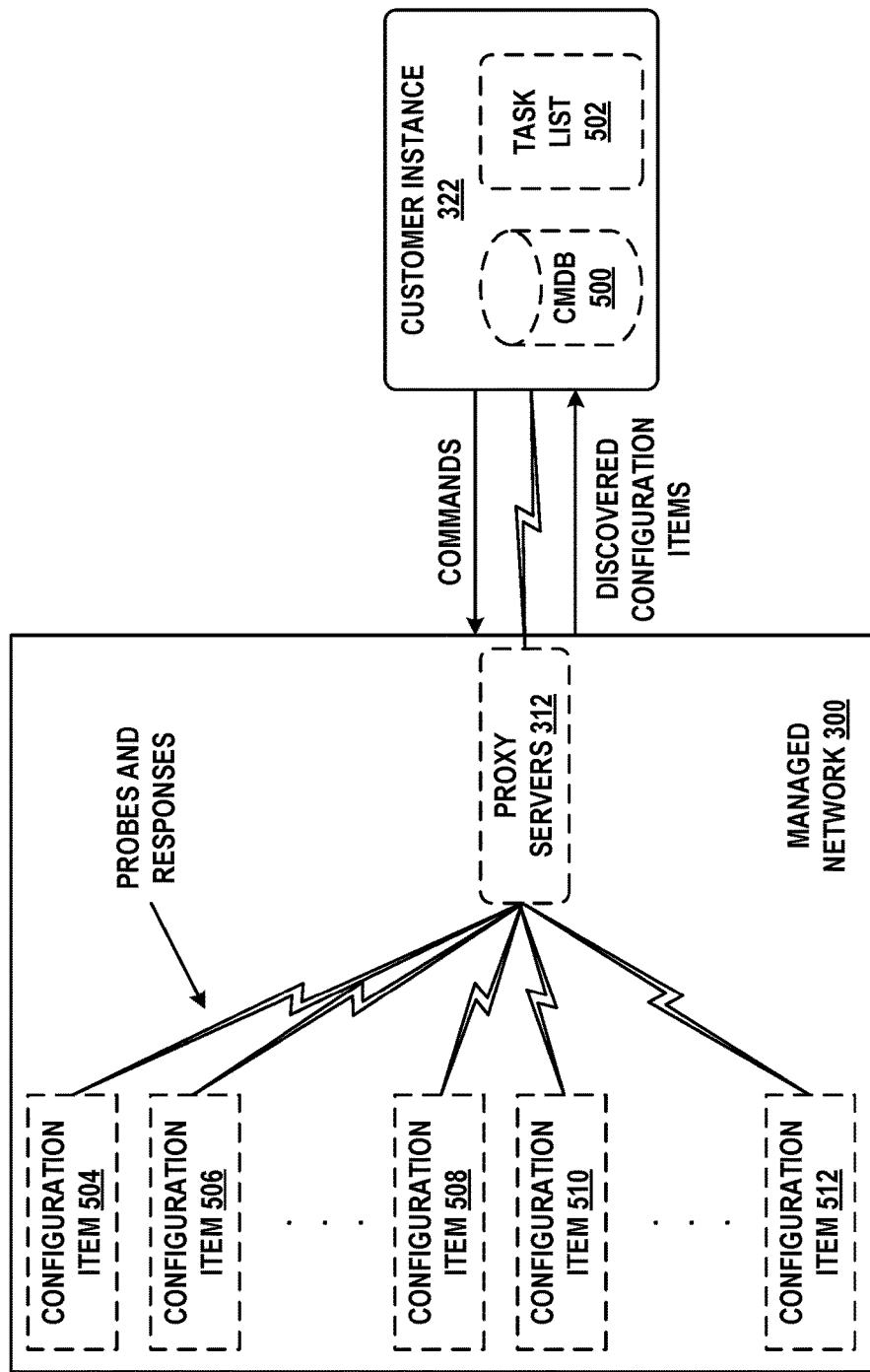
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within customer instance 322. Customer instance 322 may transmit discovery commands to proxy servers 312. In response, proxy servers 312 may transmit probes to various devices and services in managed network 300. These devices and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of customer instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, customer instance 322 may store this information in CMDB 500 and place tasks in task list 502 for discovery of devices at each of these addresses.

FIG. 5A also depicts devices and services in managed network 300 as configuration items 504, 506, 508, 510, and 512. As noted above, these configuration items represent a set of physical and/or virtual devices (e.g., client devices, server devices, routers, or virtual machines), services executing thereon (e.g., web servers, email servers, databases, or storage arrays), relationships therebetween, as well as higher-level services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, as a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (services), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device and service is available in CMDB 500. For example, after discovery, operating system version, hardware configuration and network configuration details for client devices, server devices, and routers in managed network 300, as well as services executing thereon, may be stored. This collected information may be presented to a user in various ways to allow the user to view the hardware composition and operational status of devices, as well as the characteristics of services.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
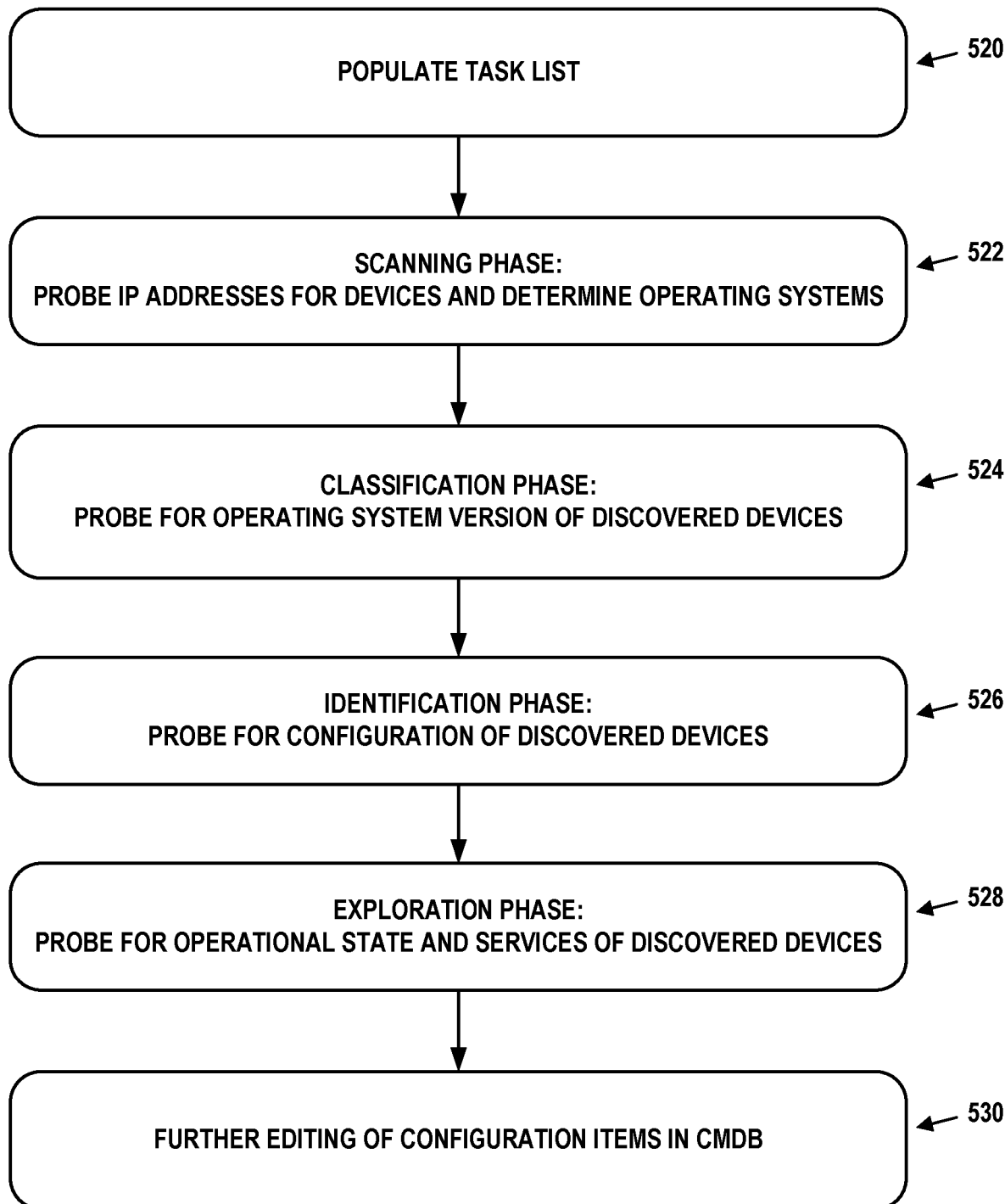
FIG. 5B is a flow chart, in accordance with example embodiments.

The discovery process is depicted as a flow chart in FIG. 5B. At block 520, the task list in the customer instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and services executing on the discovered devices. At block 530, further editing of the configuration items representing the discovered devices and services may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Visualizations

As described herein, a visualization may take various forms. Types of visualizations include time series, lists, charts, graphs, speedometers, dials, and so on. These visualizations may appear on one or more tabs of a GUI dashboard.

The term "dashboard" may refer a GUI component that contains one or more tabs. Dashboards may also be referred to as "performance analytics dashboards." In some embodiments, a dashboard may be equivalent to or contained within a GUI window. Tabs may be graphical control elements that allow multiple documents or panels to be contained within a single dashboard. Tabs may be used to switch between such documents or panels.

Each tab of a dashboard may include one or more visualizations. A visualization may be a graphical and/or text-based representation of one or more KPIs. For purpose of simplicity, the term "visualization" as used herein may refer to one or more of such representations, one or more tabs, and/or one or more dashboards. Visualizations may also be referred to as "data visualizations."

Figure 6A:
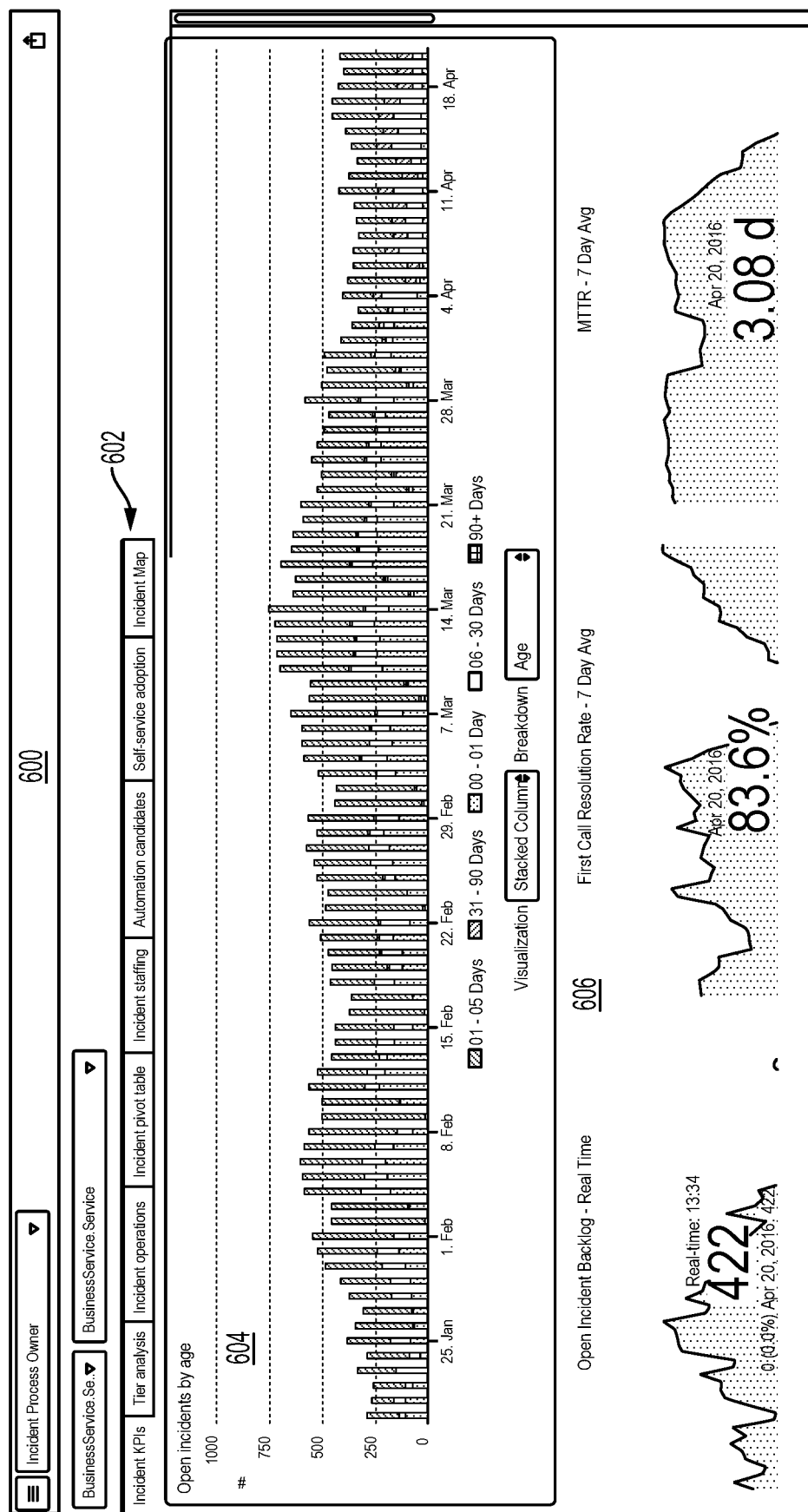
FIG. 6A depicts a dashboard, in accordance with example embodiments.
Figure 6B:
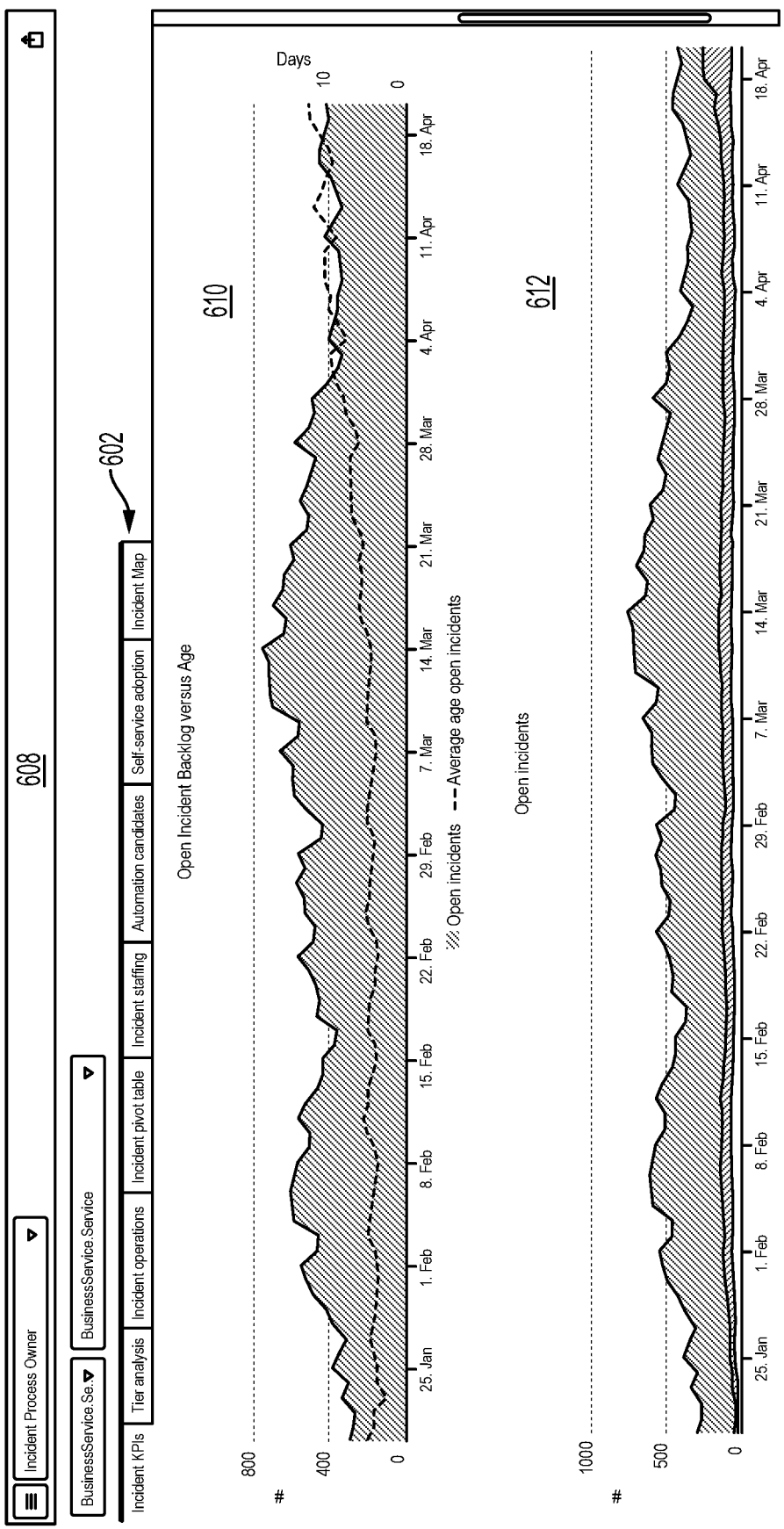
FIG. 6B depicts a dashboard, in accordance with example embodiments.

Example dashboards are shown in FIGS. 6A and 6B. Dashboard 600 of FIG. 6A includes multiple tabs 602, such as an "Incident KPIs" tab, a "Tier analysis" tab, and so on. The "Incident KPIs" tab is displayed, and includes a visualization in the form of a bar chart 604, "Open incidents by age". Bar chart 604 plots, for each day of an approximately three-month time period, the total number of open incidents for the age ranges of 0-1 days, 1-5 days, 6-30 days, 31-90 days, and over 90 days.

These incidents may be, for example, trouble tickets or help requests opened with an IT organization. Each incident may therefore involve a particular problem that a user has experienced, such as a computer crashing, a user being unable to log on to a service, slow performance of a service, a request for new equipment, and so on. The IT organization may tracks its performance by measuring how long it takes to resolve the incidents. For example, bar chart 604 suggests that there were fewer open incidents near the end of the time frame than at the middle of the time frame, but that the incidents near the end of the time frame had remained open for a longer duration.

Dashboard 600 may also include section 606, which includes visualizations for the extent of the open incident backlog (in this case, there are 422 open incidents currently), the first call resolution rate (in this case, 83.6%), and a seven-day running average of the mean time for an incident to be resolved (in this case, 3.08 days). This latter KPI may also be referred to mean time to resolution, or MTTR.

Dashboard 608 of FIG. 6B shows different example visualizations related to open incidents. This dashboard contains the same tabs 602, but includes charts 610 and 612. Chart 610 plots, for the same time frame of the visualization in FIG. 6A, open incidents against the average age of these open incidents on a dual y-axis graph. Chart 612 also plots open incidents, but includes representations of the age distribution of these incidents.

Dashboards 600 and 608 also include various selectors, such as drop down menus that allow the user to view these KPIs in different ways. Regardless of their exact mechanisms, these dashboards allow the user to rapidly determine the status of the organization's incident response KPIs through the use of visualizations that combine these KPIs.

The data displayed in bar chart 604, section 606, chart 610, and chart 612 may be visualizations defined by a data model. Thus, values associated with these visualizations may be stored in a database according to that data model, such as CMDB 500. These values may also be identified as representing one or more KPIs, and each KPI may be represented as one or more tables in the data model. As demonstrated in FIGS. 6A and 6B, multiple visualizations may use the same KPIs to provide different views of the represented data.

As noted previously, adding new visualizations or upgrading existing visualizations may require updating data within the data model as well. For instance, an upgraded visualization may change how one or more KPIs are presented versus the previous version of the visualization. Users may view such changes as disruptive and undesirable when their goal is merely to keep the software of their customer instance up to date. Notably, if the visualization is upgraded, the users may become frustrated when customizations that they made to a previous version of the visualization are no longer available.

A. Installing and Upgrading Visualizations

The embodiments herein introduce a way to add or upgrade one or more visualizations. Particularly, a user may browse, by way of a web-based interface, a list of dashboards. The user may select one or more of these dashboards, or one or more of the visualizations therein, for installation or upgrade. If a selected dashboard or visualization is not already installed in the customer instance, the dashboard or visualization may be installed. However, if the selected dashboard or visualization is already installed, the user may be prompted to decide whether to continue with the upgrade. For example, the user may be warned that continuing with the upgrade may impact behavior, appearance, and/or look and feel of the dashboard. In this way, the user has control over whether a larger-scale update takes place.

Figure 7:
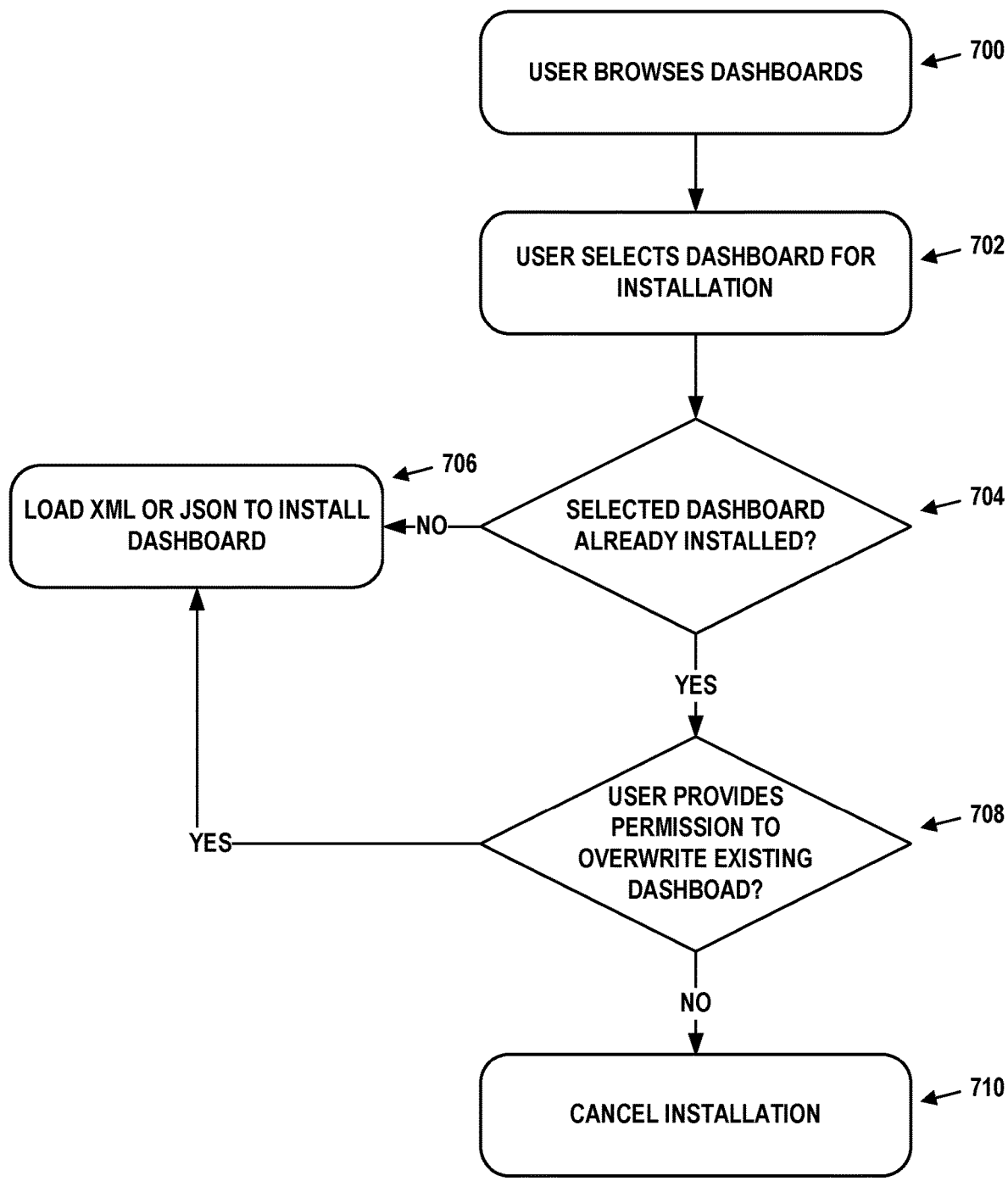
FIG. 7 is a flow chart, in accordance with example embodiments.

An example of this procedure is illustrated by FIG. 7. At block 700, the user browses one or more dashboards and/or visualizations. The user may do so by way of a web-based interface hosted by a customer instance. The customer instance may be configured to remotely manage a managed network with which the user is associated. The web-based interface may provide a selectable list of dashboards. When a particular dashboard is selected, the web-based interface may display a list of tabs included in the particular dashboard, and possibly a list of visualizations provided by these tabs.

At block 702, the user may select one or more dashboards for installation. This selection may take place, for example, by way of one or more checkboxes or similar functionality on a GUI.

At block 704, the customer instance determines whether a selected dashboard is already installed in the customer instance. For instance, each dashboard may be associated with a unique name or number, and this name or number may be registered with the customer instance when the dashboard is installed. Thus, the user selects a dashboard for installation, the customer instance may check whether a dashboard with this name or number is already registered therein.

If the dashboard is not already installed, then, at block 706, the selected dashboard may be installed. This may involve loading an XML or JavaScript Object Notation (JSON) representation of the dashboard into the customer instance. As will be discussed below, such a representation defines the visualization and the KPI(s) that it presents.

However, if the dashboard is already installed, at block 708, the user may be prompted to provide permission to overwrite the existing dashboard. For example, the customer instance may cause a popup window to be displayed on the user's client device with a message such as "Are you sure that you want to install this dashboard? Doing so will override the existing installation and customizations that you have made might not be preserved."

If the user grants permission for the upgrade, then at block 706, the selected dashboard may be upgraded. If the user does not grant permission for the upgrade, then at block 710, the installation may be cancelled.

B. Representations of Visualizations

In order to separate installation and/or upgrading of visualizations from the data model and software of the customer instance, visualizations may be represented using metadata. This metadata, which may be in XML, or JSON format for instance, may define a dashboard, its tabs, and their constituent visualizations. Prior to installing or upgrading a dashboard, a user may be able to view or modify this metadata. In some cases, only certain types of users can modify the metadata. For instance, privileged users or users associated with the remote network management platform may be able to make such modifications, whereas non-privileged users or users associated with the managed network might not be able to make such modifications.

Figure 8A:
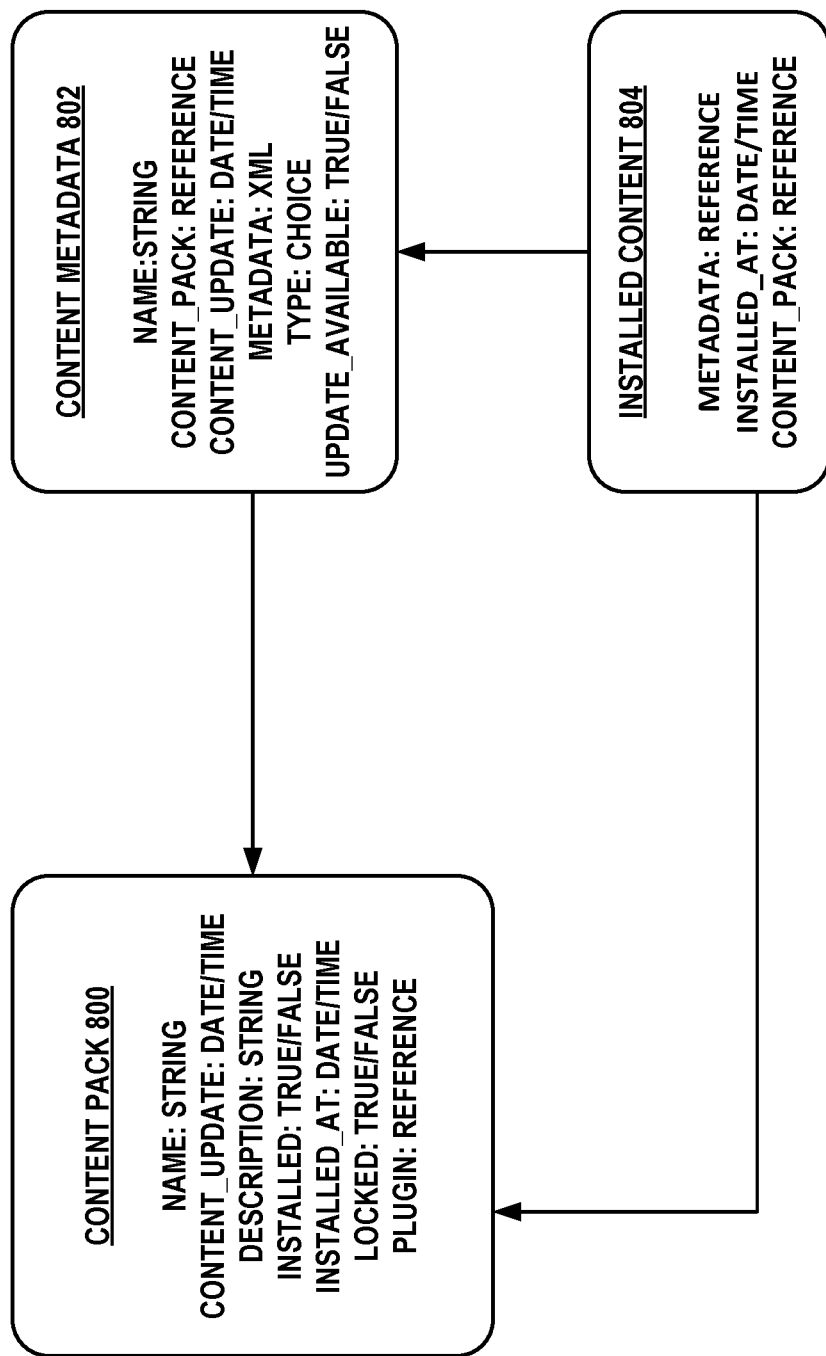
FIG. 8A depicts an organization of metadata that defines a dashboard, in accordance with example embodiments.

FIG. 8 provides an example structure for metadata. Content pack 800 may represent a dashboard. Content metadata 802 may represent data related to one or more visualizations. For instance, content metadata 802 may define user permissions with respect to use or upgrading of a visualization, and the graphical layout of the visualization. Installed content 804 may represent a time at which a particular visualization of a dashboard was installed. Each instance of content pack 800 may be associated with multiple instances of content metadata 802 and multiple instances of installed content 804. Further, each of content pack 800, content metadata 802, and installed content 804 may be tables in a data model of a customer instance.

Content pack 800 may include the following elements. In some embodiments, more or fewer elements may be present. The name element may be an alphanumeric string that represents a name of the dashboard. The content_update element may be a date and/or time that represents when the dashboard was most recently updated. The description element may be a character string that describes the dashboard. The installed element may be a Boolean value that indicates whether the dashboard is installed in the customer instance. The installed_at element may be a date and/or time that represents when the dashboard was installed. The locked element may be a Boolean value that indicates whether the dashboard is locked. The plugin element may be one or more references additional plugin content (not shown) that is associated with KPIs used by the dashboards.

Content metadata 802 may include the following elements. In some embodiments, more or fewer elements may be present. The name element may be a character string that represents a name of the visualization. The content_pack element may be a reference to an instance of content_pack 800. Particularly, each instance of content metadata 802 may represent a visualization, and may refer to an instance of content pack 800 that defines the dashboard to which the visualization belongs. The content update element may be a date and/or time that represents when the visualization was most recently updated. The metadata element may refer to one or more XML files that define the visualization (here, XML is used as just one example of how a visualization can be defined—JSON or other formats could be used instead). The type element may refer to the type of the visualization (e.g., a time series, list, chart, graph, speedometer, dial, etc.). The update_available element may be a Boolean value that indicates whether an update to the visualization is available.

Installed content 804 may include the following elements. In some embodiments, more or fewer elements may be present. The metadata element may be a reference to an instance of content metadata 802. The installed_at element may be a date and/or time that represents when the visualization referred to by the metadata element was installed. The content_pack element may be a reference to an instance of content_pack 800.

The metadata may be viewable and/or editable by way of a graphical user interface. Therefore, a user may be able to review and/or modify a dashboard's metadata prior to or after installing the dashboard. Furthermore, the user may be able to export the metadata to a local file on the user's client device or import the metadata from such a local file to a customer instance. Consistent with previous discussions, only certain types of users might be able to modify, import, or export the metadata.

In this manner, users can customize existing visualizations or create new visualizations. Users may also be able to share this metadata with other users. Thus, visualizations can rapidly be adapted to support various KPIs.

FIG. 8B depicts example visualization code 806 in XML, format. This XML, representation roughly corresponds to a metadata entry in a content metadata 802 table, for instance. Notably, visualization code 806 includes markup elements that define the appearance of a visualization. These elements specify that the visualization includes a chart, the type of chart, the format of the columns, the color scheme of the visualization, the labeling of the axes, and so on. In particular, visualization code 806 includes the markup element "indicator", which specifies a KPI that the visualization uses. This KPI is referred to as an alphanumeric string, "9f3dac02d7231100b96d45a3ce610326".

VI. Example Operations

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

In accordance with these embodiments, one or more databases may be disposed within a remote network management platform. The one or more databases may include a data model that represents configuration and operational characteristics of computing devices disposed within a managed network. The managed network may be managed by the remote network management platform. The configuration and operational characteristics may include KPIs related to the managed network. Additionally, one or more server devices may be disposed within the remote network management platform. These servers may be configured to carry out the following operations.

Block 900 may involve receiving, by way of a graphical user interface displayed on a client device, a request to install or upgrade a performance analytics dashboard displayable by the graphical user interface. The performance analytics dashboard may define a data visualization related to a particular KPI. In some embodiments, the data visualization is one of a time series, a list, a chart, a graph, a speedometer, or a dial that represents the particular KPI.

Block 902 may involve determining that installing or upgrading the performance analytics dashboard requires updating data within the data model. Block 904 may involve receiving, by way of the graphical user interface, permission to update the data within the data model.

Block 906 may involve, possibly in response to receiving permission to update the data within the data model, updating the data within the data model then installing or upgrading the performance analytics dashboard. When the data model includes a representation of the particular KPI, the data visualization is displayable on the graphical user interface to represent the particular KPI.

In some embodiments, the performance analytics dashboard may define the data visualization in the XML or JSON formats. The XML or JSON definitions may be stored in the one or more databases. The one or more server devices may also provide, by way of the graphical user interface, an editable representation of the XML or JSON definitions. Alternatively or additionally, the one or more server devices may export, by way of the graphical user interface, a representation of the XML or JSON definitions to a file stored on the client device. Alternatively or additionally, the one or more server devices may import, by way of the graphical user interface, a representation of the XML or JSON definitions from a file stored on the client device.

In some embodiments, the one or more server devices may provide, by way of the graphical user interface, a list of available performance analytics dashboards. The performance analytics dashboard may be one of the available performance analytics dashboards, and the request to install or upgrade the performance analytics dashboard may be received as a selection from the list.

In some embodiments, when the data model does not include the representation of the particular KPI, the visualization is displayable on the graphical user interface to represent an error condition.

In some embodiments, the one or more server devices may, in response to determining that installing or upgrading the performance analytics dashboard requires updating the data within the data model, query, by way of the graphical user interface, for permission to update the data within the data model.

In some embodiments, the one or more server devices may provide, by way of the graphical user interface, a graphical representation of the data visualization. Providing the graphical representation of the data visualization may cause a display unit of the client device to display the graphical representation of the data visualization.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system, comprising:
    a processor; and
    a memory, wherein the memory stores instructions that, when executed by the processor, cause the processor to perform operations comprising:
        receiving, from a computing device via a graphical user interface, a first user input indicative of a selection of an upgrade to a visualization displayable by the graphical user interface, wherein the visualization represents a key performance indicator associated with a managed network;
        transmitting, to the computing device for display via the graphical user interface, code that corresponds to the upgrade to the visualization, wherein the code is defined in a data model, wherein transmitting the code causes the graphical user interface to display the code, wherein the displayed code specifies how the visualization presents information associated with the key performance indicator via the graphical user interface, and wherein the displayed code comprises a reference to the key performance indicator;

receiving, from the computing device via the graphical user interface, a second user input that modifies the displayed code;

transmitting, to the computing device via the graphical user interface, a prompt for permission to process the second user input that modifies the displayed code to generate modified code;

receiving, from the computing device via the graphical user interface, a third user input indicative of permission to process the second user input that modifies the displayed code to generate the modified code; and storing the modified code in the data model.

2. The system of claim 1, wherein the operations comprise executing the upgrade to the visualization based on the modified code.

3. The system of claim 1, wherein the operations comprise determining that the upgrade to the visualization will update data associated with the visualization within the data model in response to receiving the first user input indicative of the selection of the upgrade to the visualization.

4. The system of claim 1, wherein the modified code comprises an extensible markup language (XML) definition or a JavaScript Object Notation (JSON) definition.

5. The system of claim 1, wherein the operations comprise transmitting, to the computing device for display via the graphical user interface, respective representations of a plurality of upgrades to different visualizations displayable by the graphical user interface.

6. The system of claim 5, wherein the upgrade to the visualization is selected using the respective representations of the plurality of upgrades.

7. The system of claim 1, wherein the operations comprise determining that a user associated with the computing device has a privilege to modify the code that corresponds to the upgrade to the visualization after receiving the first user input indicative of the selection of the upgrade to the visualization.

8. A method, comprising:

receiving, from a computing device via a graphical user interface, a first user input indicative of a selection of an upgrade to a visualization displayable by the graphical user interface, wherein the visualization represents a key performance indicator associated with a managed network;

transmitting, to the computing device for display via the graphical user interface, code that corresponds to the upgrade to the visualization, wherein the code is defined in a data model, wherein transmitting the code causes the graphical user interface to display the code, wherein the displayed code specifies how the visualization presents information associated with the key performance indicator via the graphical user interface, and wherein the displayed code comprises a reference to the key performance indicator;

receiving, from the computing device via the graphical user interface, a second user input that modifies the displayed code;

transmitting, to the computing device via the graphical user interface, a prompt for permission to process the second user input that modifies the displayed code to generate modified code;

receiving, from the computing device via the graphical user interface, a third user input indicative of permission to process the second user input that modifies the displayed code to generate the modified code; and storing the modified code in the data model.

9. The method of claim 8, comprising executing the upgrade to the visualization based on the modified code.

10. The method of claim 8, comprising determining that the upgrade to the visualization will change how the visualization represents the key performance indicator in response to receiving the first user input indicative of the selection of the upgrade to the visualization.

11. The method of claim 8, wherein the modified code comprises an extensible markup language (XML) definition or a JavaScript Object Notation (JSON) definition.

12. The method of claim 8, comprising transmitting, to the computing device for display via the graphical user interface, respective representations of a plurality of upgrades to different visualizations displayable by the graphical user interface.

13. The method of claim 12, wherein the upgrade to the visualization is selected using the respective representations of the plurality of upgrades.

14. The method of claim 8, comprising determining that a user associated with the computing device has a privilege to modify the code that corresponds to the upgrade to the visualization after receiving the first user input indicative of the selection of the upgrade to the visualization.

15. The method of claim 8, wherein the reference to the key performance indicator comprises an emphasized portion of the code.

16. A non-transitory, computer-readable medium, comprising machine-readable instructions that, when executed by a processor, cause the processor to perform operations comprising:

receiving, from a computing device via a graphical user interface, a first user input indicative of a selection of an upgrade to a visualization displayable by the graphical user interface, wherein the visualization represents a key performance indicator associated with a managed network;

transmitting, to the computing device for display via the graphical user interface, code that corresponds to the upgrade to the visualization, wherein transmitting the code causes the graphical user interface to display the code, wherein the displayed code specifies how the visualization presents information associated with the key performance indicator via the graphical user interface, and wherein the displayed code comprises a reference to the key performance indicator;

receiving, from the computing device via the graphical user interface, a second user input that modifies the displayed code;

transmitting, to the computing device via the graphical user interface, a prompt for permission to process the second user input that modifies the displayed code to generate modified code;

receiving, from the computing device via the graphical user interface, a third user input indicative of permission to process the second user input that modifies the displayed code to generate the modified code; and executing the modified code to upgrade the visualization.

17. The non-transitory, computer-readable medium of claim 16, wherein the modified code comprises an extensible markup language (XML) definition or a JavaScript Object Notation (JSON) definition.

18. The non-transitory, computer-readable medium of claim 16, wherein the operations comprise determining that a user associated with the computing device has a privilege to modify the code that corresponds to the upgrade to the visualization after receiving the first user input indicative of the selection of the upgrade to the visualization.

19. The non-transitory, computer-readable medium of claim 16, wherein the reference to the key performance indicator comprises an emphasized portion of the code.

\* \* \* \* \*